United States Patent Office 3,709,844
Patented Jan. 9, 1973

3,709,844
POLY(p-STYRENESULFONYLHYDRAZIDES) AS BLOWING AGENTS FOR PLASTICIZED POLY-(VINYL CHLORIDE)
John E. Herweh and Algirdas C. Poshkus, Lancaster, Pa., assignors to Armstrong Cork Company, Lancaster, Pa.
No Drawing. Original application July 30, 1968, Ser. No. 748,658, now Patent No. 3,654,242. Divided and this application Nov. 20, 1970, Ser. No. 91,531
Int. Cl. C08f 47/10, 29/24
U.S. Cl. 260—2.5 P                1 Claim

ABSTRACT OF THE DISCLOSURE

A novel class of polymeric compositions having repeating structural units of the formula

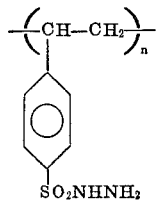

These compositions find utility as polymeric blowing agents for use in forming foamed resinous compositions.

CROSS-REFERENCE TO RELATED APPLICATION

This is a division of application Ser. No. 748,658, filed July 30, 1968, now Pat. No. 3,654,242.

BACKGROUND OF THE INVENTION

Field of the invention

This invention relates to sulfonylhydrazide type blowing agents in general and more specifically to poly(styrenesulfonylhydrazides).

Description of the prior art

An important class of chemical blowing agents useful in forming foamed resinous products are those based on the sulfonylhydrazide moiety. Typical organic sulfonylhydrazides are disclosed in U.S. Pat. No. 2,830,086.

SUMMARY OF THE INVENTION

We have now discovered that polystyrene resins having an average molecular weight in the range of from about 10,000 to 500,000 may be readily chlorosulfonated and those chlorosulfonated polystyrene resins in turn readily reacted with hydrazine to form the corresponding poly(p-styrenesulfonylhydrazides). These polymeric hydrazides are useful as blowing agents for a wide variety of organic resinous materials.

DESCRIPTION OF THE PREFERRED EMBODIMENTS

A solution of the polystyrene resin in a suitable solvent such as ethylene dichloride, is added to an excess of chlorosulfonic acid to form a chlorosulfonated polystyrene resinous reaction product. This chlorosulfonated polystyrene in a suitable solvent medium, preferably a polar inert solvent such as tetrahydrofuran, is then reacted with hydrazine and the poly(styrenesulfonylhydrazide) is precipitated from the reaction mixture. Hydrazine hydrochloride, a by-product of the reaction, is also precipitated and removed by repeatedly washing with cold water.

It is possible to form a variety of useful polymeric blowing agents varying as to their molecular weight and gas producing capacity. Generally, it is preferred that the poly(styrenesulfonylhydrazides) have approximately 0.2 to 1.0 nuclear sulfonylhydrazide groups per styrene unit.

The following examples illustrate specific embodiments of our invention.

Example 1

A solution of polystyrene (DOW PS-2) having a molecular weight of about 20,000 (50 grams, 0.48 mole in 180 milliliters of ethylene dichloride) was added dropwise in four hours to stirred chlorosulfonic acid (560 grams, 4.80 mole) maintained at —4° (±1°) C. After standing three hours at 0° (±1°) C. followed by approximately 16 hours at room temperature, the amber reaction mixture was added to ice and a white to cream-colored solid precipitated. The filtered precipitate was triturated and washed repeatedly with ice cold water. The aqueous filtrate and washings were discarded; the filter-cake washed with petroleum ether and finally dried in vacuum (approximately 10 mm.) at 30°±5° C. until a constant weight was obtained. The dried crude reaction product (95.6 grams) was precipitated from solution in tetrahydrofuran by its addition to petroleum ether and gave a product which analyzed as follows:

Analysis.—Calcd. for $C_8H_7ClO_2S$ (percent): C, 47.41; H, 348; Cl, 17.50; S, 15.82. Found (percent): C, 46.04; H, 3.82; Cl, 14.11; S, 15.92.

A 20-gram portion of the chlorosulfonated polystyrene in 150 ml. of tetrahydrofuran was cooled to 0 to 5° C. and treated with 8.22 grams of aqueous 85% hydrazine. After standing aproximately 2½ hours at room temperature, the reaction mixture containing a finely divided solid was filtered. The filter-cake was washed consecutively with fresh tetrahydrofuran and ether and air-dried. The combined filtrate and washings were discarded. The dried, finely-divide pale tan to yellow solid was triturated and washed with cold water to remove hydrazine hydrochloride. The aqueous insoluble solid was then washed consecutively with methyl alcohol and ether to give 18.2 grams, after drying, of poly(p-styrene sulfonylhydrazide). Precipitation of the reaction product from solution in dimethylformamide by addition to benzene gave a product which analyzed as follows:

Analysis.—Calcd. for $C_8H_{10}N_2O_2S$ (percent): C, 48.46; H, 5.08; N, 14.13; S, 16.18. Found (percent): C, 48.03; H, 5.18; N, 13.73; S, 15.73.

Example 2

The reaction of Example 1 was repeated using a polystyrene resin (DOW PS-683) having a molecular weight of about 200,000. 25 grams (0.24 mole) of the polystyrene resin was added to 214 grams (1.84 moles) of chlorosulfonic acid. After completing the addition which required approximately 2 hours, additional chlorosulfonic acid (174.5 grams, 1.5 moles) was added to the brown to amber reaction mixture possessing the consistency of taffy to facilitate stirring. The reaction mixture was treated as in Example 1 and yield was 48.5 grams of a white powder. The crude reaction product was insoluble in tetrahydrofuran and analyzed:

Analysis.—Calcd. for $C_8H_7ClO_2S$ (percent): C, 47.41; H, 3.48; Cl, 17.50; S, 15.82. Found (percent): C, 44.34; H, 4.54; Cl, 11.15; S, 15.36.

A 20-gram (0.1 mole) portion of the chlorosulfonated polystyrene resin was added over a period of 30 minutes to 200 milliters of a stirred aqueous solution of hydrazine (3.76 grams, 0.1 mole) and sodium hydroxide (4.0 grams, 0.1 mole) at 5° (±1°) C. After completing the addition, the reaction mixture was stirred at room temperature for three hours. The alkaline reaction mixture was cooled to 5° C. and neutralized with nine milliliters of 3 N hydrochloric acid. The cream-colored precipitate formed in the reaction mixture was filtered and washed consecutively with cold water, methyl alcohol and ether. The insoluble product was dried in vacuo to give 16.4 grams of poly(p-styrenesulfonylhydrazide).

The hydrazinolysis may also be carried out in aqueous media using sodium hydroxide as the hydrogen chloride acceptor. Thus, powdered chlorosulfonated polystyrene from Example 1 (20 g. 0.10 mole) was added portionwise in 25 minutes to an ice cold aqueous solution (200 ml.) containing 85% hydrazine (3.76 g., 0.1 mole) and sodium hydroxide (4 g. 0.1 mole) in a Waring Blendor. The reaction mixture, consisting of a finely divided cream-colored solid, was stirred for 70 minutes during which time the reaction temperature rose to 35° C. After 1 hour at ice bath temperatures, the reaction mixture was filtered. Due to the fine particle size, filtration was extremely slow. The cream-colored filter-cake was slurried with cold water (100 ml.) one time and filtered. After washing the aqueous insoluble solid consecutively with methyl alcohol and ether, it was dried in vacuo to a constant weight (10.2 g.). An infrared absorption spectrum (KBr) of the crude product was similar to that obtained for the product prepared using THF as a reaction solvent and excess hydrazine as the acid acceptor.

The poly(p-styrenesulfonylhydrazide) of Example 1 on heating slowly in air gradually decomposed and darkened at from about 172°–190° to 300° C. Thermogravimetric analysis of a sample in air utilizing a heating rate of approximately 6° C. per minute showed a rapid decomposition with a weight loss of 26 to 28% at approximately 150° C. The weight loss closely corresponds to that calculated in accordance with the equation:

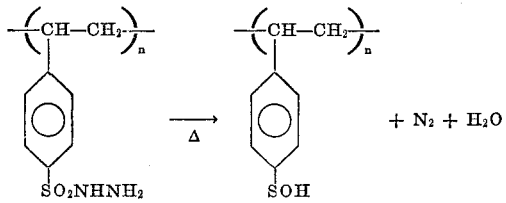

Thermal decomposition of suspensions of the poly(p-styrenesulfonylhydrazide) of Example 1 in Nujol at approximately 150° C. proceeded smoothly to give nitrogen in 80 to 85% yield of theory. Sulfur dioxide and hydrogen sulfide were not detected as components of the volatile decomposition products.

The poly(p-styrenesulfonylhydrazide) of Example 2 on heating slowly in air gradually decomposed and darkened at from about 180 to 300° C. Thermogravimetric analysis of a sample in air utilizing a heating rate of approximately 6° C. per minute showed a rapid decomposition with a weight loss of 15 to 16% at approximately 160° C.

Example 3

A poly(vinyl chloride) dry blended composition was prepared by mixing a masterbatch of the following formulation in a Henschel Blendor at a temperature below about 200° F.

| Ingredient: | Weight in grams |
|---|---|
| Poly(vinyl chloride) homopolymer having number average M.W. of 26,000 and weight average of 54,000 | 100 |
| Dioctyl phthalate | 70 |
| Expoxidized soybean oil | 5 |
| Liquid Ca-Zn octoate stabilizer | 4 |
| 50 mesh limestone | 10 |
| $TiO_2$ pigment | 2 |
| Calcium silicate | 0.75 |
| Polymeric blowing agent from Example 1 | 2.59 |

Portions of the poly(vinyl chloride) dry blend thus prepared and containing the polymeric blowing agent were spread to a thickness of 120 mils on release-type felt and were expanded in an open oven to yield foams of a homogenous coarse cell structure; several foams were prepared under various conditions for expansion with varying resultant foam densities which are recorded in Table I below.

TABLE I.—POLY(VINYL CHLORIDE) FOAMS PREPARED

| Sample Number: | Conditions for expansion time in minutes | Platent temps. ° C. | | Foam density (lbs./cu. ft.) |
|---|---|---|---|---|
| | | Top | Bottom | |
| 1 | 1.00 | 1,020 | 420 | 25.8 |
| 2 | 1.17 | 945 | 390 | 29.8 |
| 3 | 1.33 | 950 | 390 | 42.6 |
| 4 | 1.50 | 960 | 390 | 37.2 |
| 5 | 1.25 | 1,020 | 420 | 35.9 |

Sample No. 5 was a poly(vinyl chloride) from prepared from dry blend formulated in accordance with Example 3 except that 4,4' oxybis (benzenesulfonylhydrazide) was substituted for the poly(p-styrenesulfonylhydrazide), 2.25 grams being substituted in the formulation set forth in Example 3 for the 2.59 grams of the polymeric blowing agent (calculated to give an equivalent gas yield).

What is claimed is:

1. The process for forming a foamed resinous composition which comprises incorporating a sufficient amount of a poly(p-styrenesulfonylhydrazide) having 0.2 to 1.0 nuclear sulfonylhydrazide groups per styrene unit and an average molecular weight of the polystyrene resin within the range of approximately 10,000 to 500,000 in a plasticized poly(vinyl chloride) resin and heating this mixture to a temperature above the decomposition point of said poly(p-styrenesulfonylhydrazide).

References Cited

UNITED STATES PATENTS 2,830,086  4/1958  Stempel _____ 260—2.5 R
2,778,813  1/1957  Gaspar et al. _____ 260—78.5 R SAMUEL H. BLECH, Primary Examiner W. J. BRIGGS, SR., Assistant Examiner U.S. Cl. X.R.

260—31.8 M, 31.8 R, 79.3 R, 899